United States Patent Office 3,312,180
Patented Apr. 4, 1967

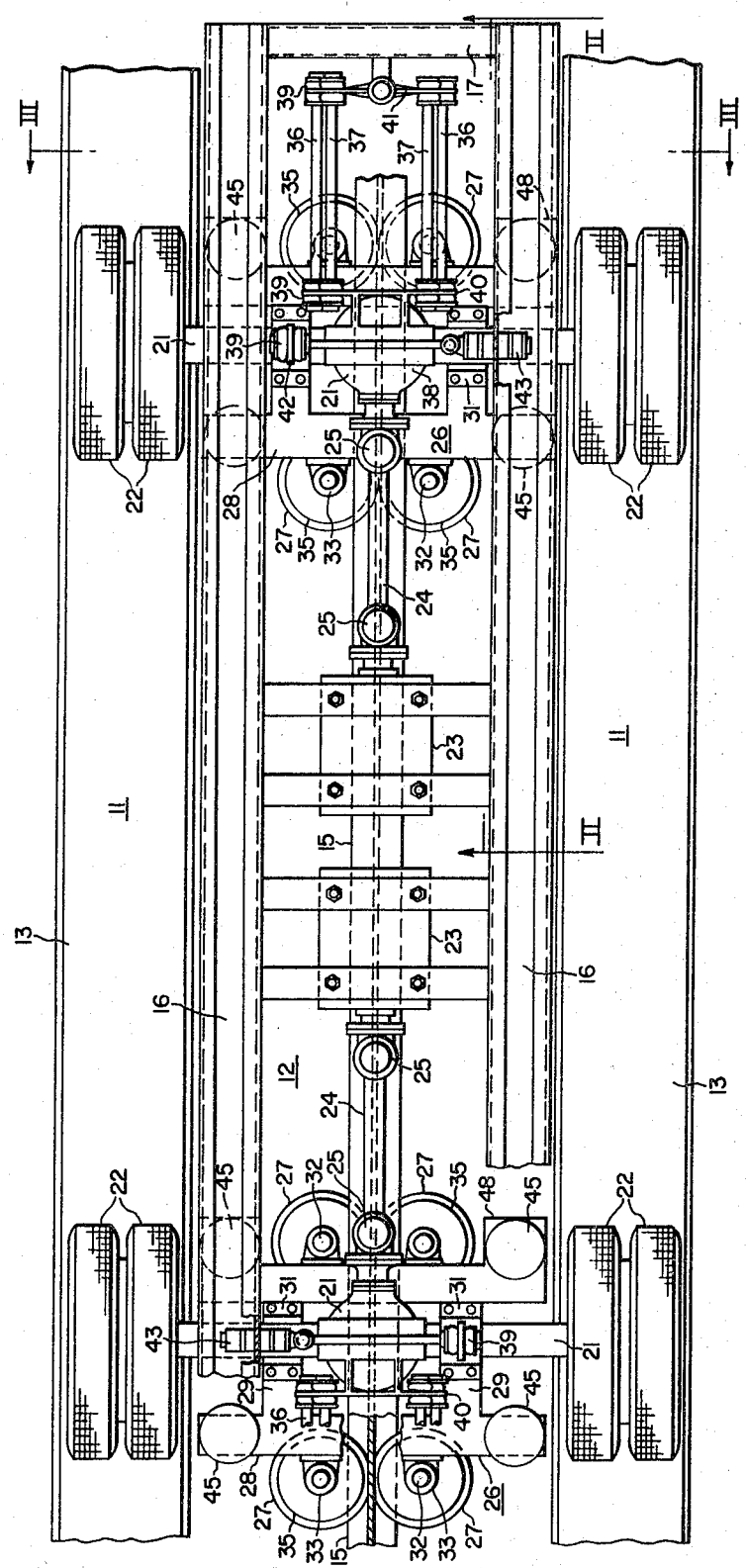
FIG.I.

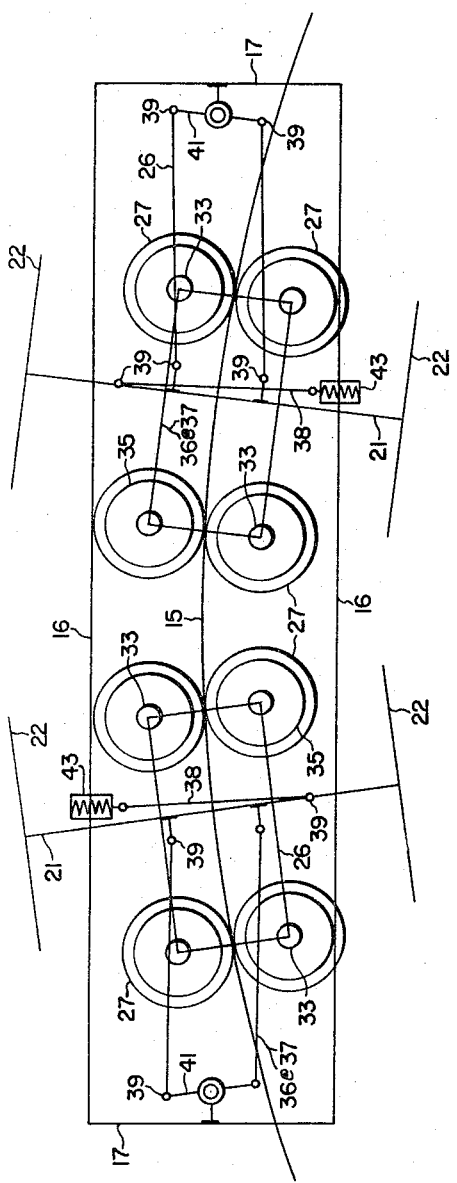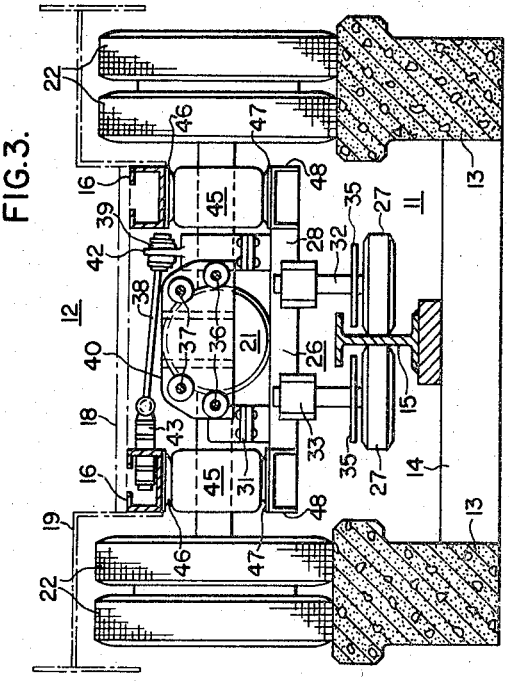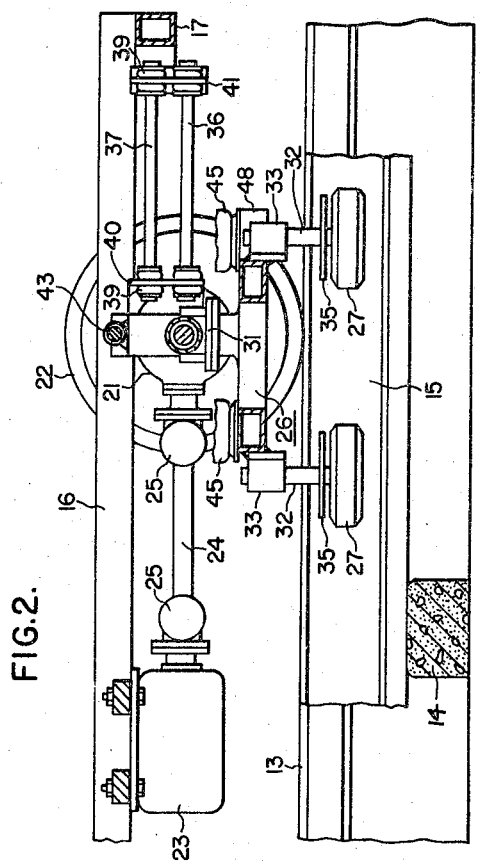

3,312,180
TRANSPORTATION VEHICLES
Erich O. Mueller, Irwin, Pa., assignor to Westinghouse Electric Corporation, Pittsburgh, Pa., a corporation of Pennsylvania
Filed Sept. 22, 1964, Ser. No. 398,212
7 Claims. (Cl. 104—246)

This invention relates, generally, to transportation vehicles and, more particularly, to vehicles of the self-steering or self-guiding type.

The invention provides a guidance system for vehicles intended for use in a rapid transit system in which the vehicles or cars are automatically controlled and, therefore, must be self-steering. These vehicles are relatively light in weight and they have rubber-tired wheels which run on relatively narrow tracks or rails which may be located on an elevated structure a considerable distance above ground. High winds can upset these lightweight, rubber-tired vehicles, so the guidance system must not only steer the vehicle but also positively restrain it against being upset by wind forces.

An object of this invention is to provide for guiding or steering a vehicle having rubber-tired wheels which run on supporting tracks or roadways.

Another object of the invention is to provide restraining means for preventing the vehicle from being upset or derailed by wind forces or obstructions.

A further object of the invention is to coordinate the steering means and the restraining means for the vehicle.

Still another object of the invention is to provide a restraining means which will take over the guiding of the vehicle in case of tire failure on the guiding wheels.

A still further object of the invention is to provide for steering a vehicle which is intended to operate predominantly in one direction, but which can be operated in either direction.

Other objects of the invention will be explained fully hereinafter or will be apparent to those skilled in the art.

In accordance with one embodiment of the invention a two-axle, rubber-tired vehicle is steered by four guide wheels per axle which engage the web of an I-shaped guide rail mounted in the center of a roadway structure. The four guide wheels per axle are assembled in a frame which is rigidly bolted to the axle housing, thereby forcing the axle to follow the guide rail. A steel disc having a diameter less than the outside diameter of the rubber tire of the guide wheel when inflated is rigidly fastened to each guide wheel. The discs will engage the upper flange of the guide rail to prevent the vehicle from upsetting or leaving the track. The safety disc on each wheel will also take over the guiding of the vehicle in case of a failure of the tire.

For a better understanding of the nature and objects of the invention, reference may be had to the following detailed description, taken in conjunction with the accompanying drawings, in which:

FIGURE 1 is a view, in plan, of a portion of a transportation vehicle and supporting roadway structure embodying principal features of the invention;

FIG. 2 is a view, in longitudinal section, taken along line II—II in FIG. 1, of the guiding device for one of the axle units for the vehicle;

FIG. 3 is a view in transverse section, taken along line III—III in FIG. 1, of the vehicle and roadway structure shown in FIG. 1; and FIG. 4 is a diagrammatic view showing the positions of the axles, guiding device and connections between the axles and the vehicle frame.

Referring to the drawings, and particularly to FIGS. 1, 2 and 3, the structures shown therein comprise a roadway 11 and a transportation vehicle 12 which runs upon the roadway 11. As shown most clearly in FIG. 3, the roadway 11 is of the elevated type and includes two spaced tracks 13 which support the vehicle 12, and cross members 14 which support an I-shaped guide rail 15 which is disposed between the supporting rails 13 and is coextensive with the roadway. The supporting tracks 13 and the cross members 14 are preferably made of concrete, although other suitable materials may be utilized. Furthermore, the roadway need not necessarily be elevated, as the vehicle may be operated on a surface level roadway.

The portion of the vehicle 12 shown in the drawings includes longitudinal frame members 16, cross members 17, and a floor 18 for a body 19, only a portion of which is shown in FIG. 3. The body 19 may be of the bus type having a plurality of seats therein for the accommodation of passengers, or may be of any other desired type.

The vehicle has two axles disposed inside axle housings 21 on which rubber-tired wheels 22 are rotatably mounted. The wheels 22 run on the tracks 13 and tractive effort for propelling the vehicle is supplied by traction motors 23 which may be mounted on frame members of the vehicle. Each axle is driven by one of the traction motors through a drive shaft 24 and a differential gearing disposed inside the axle housing 21. The wheels 22 are driven by the axles in the usual manner of automotive vehicles. Universal joints 25 are provided for the drive shafts 24. The traction motors 23 are preferably electric motors, although internal combustion motors might be utilized if desired.

The vehicle is intended to be automatically controlled, and it is necessary to provide for guiding the vehicle on straight tracks and for steering the vehicle on curves with the axles in a position of minimum tire slip angle, since the vehicle is to be capable of operation without an operator. In order to guide and steer the vehicle, a guide wheel frame 26 is rigidly attached to each axle, and four guide wheels 27 are rotatably mounted on vertical axes on the frame 26 to engage the web of the guide rail 15. Each guide wheel frame 26 comprises members 28 and 29 which are joined to form a generally rectangular framework. The members 29 of the guide wheel frame are attached to the axle housings 21 by joints 31 which may be bolted together. Each guide wheel 27 is rotatably mounted on a shaft 32 having an eccentric end which is clamped in a split bushing 33 attached to the guide frame 26. The pneumatic tires on the guide wheels 27 may be pressed against the guide rail web to produce pre-loading forces by clamping the eccentric shafts 32 in a position to produce the desired pre-loading.

As shown most clearly in FIG. 1, and also in the diagrammatic view of FIG. 4, the four guide wheels 27 are mounted sufficiently far away from the center line of the axle to create a steering moment which positions the axle nearly radially in curves. The guide wheels are shown in unsymmetric arrangement with respect to the axle. This provides advantages in steering for vehicles which operate predominantly in one direction which is assumed to be to the left as shown in the drawings. The longer distance from the center line of the axle is in the lead position.

Thus, the two guide wheels 27 which are in front of the axle engage opposite sides of the web of the guide wheel 15 at a point which is farther from the axle than the point at which the two guide wheels at the rear of the axle engage the web of the guide rail. In this manner, the steering moment is increased when the vehicle is operating to the left as shown in the drawings. However, the vehicle can be satisfactorily operated in the opposite direction when desired.

Each axle and its guiding device become an assembled unit. This forces the axle to follow the direction of the guide rail within the limits of the flexibility of the pneumatic guide wheel tires. Excessive tire deflections due to abnormal lateral forces, or due to under-inflation, are limited by steel safety discs 35, one of which is attached to each guide wheel. The diameter of each disc 35 is slightly less than the diameter of the guide wheel tire when it is fully inflated. Thus, if a guide wheel tire becomes deflated, its corresponding safety disc will engage the web of the guide rail 15 to take over the steering of the vehicle.

The web of the guide rail transmits lateral wind forces, as well as the centrifugal and steering forces, to the roadway structure. The guide rail flange prevents the vehicle from derailing or upsetting, since the flange will be engaged by the safety discs 35 on one side of the vehicle in case it attempts to upset or become derailed. Thus, the safety discs perform dual functions in the operation of the vehicle.

The connections between axles and the vehicle frame must be so arranged that the axles are relatively free to move into the required position when the vehicle is going around a curve. A controlled lateral motion between axles and vehicle frame is also essential. Tractive effort is transmitted by tie rods 36 and torque reactions by tie rods 37. A lateral connection between each axle and the vehicle frame is made by a transverse rod 38. The ends of the rods 36, 37 and 38 are fastened by joints 39 which permit a limited spherical motion. The rods 36 and 37 are connected to an upright member 40 on the axle housing 21, as shown, and to a cross member 17 of the vehicle frame by means of a symmetrical swing arm 41 which is pivotally attached to the cross member 17 as sown most clearly in FIG. 1. This arrangement forms a parallelogram which acts in curves as shown in the schematic diagram in FIG. 4.

The transverse rod 38 is fastened to an upwardly extending projection 42 on the axle housing 21 by a joint 39. The other end of the transverse rod 38 is fastened to a frame member 16 by a joint 39 and a lateral spring arrangement 43. The transverse rods position the axles in their lateral relation to the vehicle frame. The lateral springs 43 permit a controlled motion between the vehicle frame and the axles which helps to prevent lateral motions from the axles from acting directly on the vehicle body. Only the tie rods for one axle are shown in FIG. 1 of the drawings. The other axle is equipped with the same torque and tractive effort tie rods and transverse rod as are shown for the one axle. Roll bars are also preferably provided but have been omitted in order not to complicate the drawings.

In order to support the weight of the vehicle, resilient means, such as air springs 45, are disposed between the vehicle frame and the guide wheel frames 26. As shown most clearly in FIG. 3, each spring 45 may be disposed between a plate 46, which spans channel members 16 of the vehicle frame, and a slide plate 47 attached to a channel member 48 of the guide wheel frame 26. Thus, relative movement between the vehicle frame and the guide wheel frame is permitted. A combination of air springs and helical steel springs may be utilized in place of the air springs 45 if desired. Vertical and lateral shock absorbers of any suitable type may also be provided.

From the foregoing description, it is apparent that the invention provides for steering a transportation vehicle which operates on its own right of way and which has no operator on the vehicle. The guiding arrangement herein described guides the vehicle on straight tracks, steers the vehicle axles on curves into a position of minimum tire slip angle, and prevents the vehicle from upsetting due to wind forces or track obstructions. The arrangement is relatively simple in structure and it may be manufactured and installed at a relatively low cost.

Since numerous changes may be made in the above described construction and different embodiments of the invention may be made without departing from the spirit and scope thereof, it is intended that all the subject matter contained in the foregoing description or shown in the accompanying drawings shall be interpreted as illustrative and not in a limiting sense.

I claim as my invention:

1. In a transportation system having spaced supporting tracks and a flanged guide rail disposed between said tracks and parallel thereto, a vehicle having a frame, a plurality of axle means carrying wheels running on said tracks, means for independently connecting each axle means directly to the frame to permit limited relative movement therebetween, at least one pair of opposed guide wheels mounted on vertical axes on each of said axle means in position to engage opposite sides of said guide rail, and means for rigidly attaching said guide wheels to the axle means, each of said guide wheels having a disc member coaxial therewith, the disc members having a diameter less than the normal diameter of the guide wheels and extending under the flange of the guide rail, said disc members being normally spaced from the guide rail and being adapted to engage the flange of the guide rail to resist lateral forces on the vehicle.

2. In a transportation system having spaced supporting tracks and a flanged guide rail disposed between said tracks and parallel thereto, a vehicle having a frame, a plurality of spaced axle means carrying wheels running on said tracks, means for independently connecting each of the axle means directly to the frame to permit limited relative movement therebetween, a guide wheel frame rigidly attached to each of the axle means, each guide wheel frame carrying a pair of opposed guide wheels on one side of the axle means and a pair of opposed guide wheels on the other side of the axle means, each pair of guide wheels being mounted on vertical axes in position to engage opposite sides of said guide rail, each of said guide wheels having a disc member coaxial therewith, the disc members having a diameter less than the normal diameter of the guide wheels and extending under the flange of the guide rail, said disc members being normally spaced from the guide rail and being adapted to engage the flange of the guide rail to resist lateral forces on the vehicle.

3. In a transportation system, in combination, two spaced supporting tracks, a flanged guide rail disposed between the supporting tracks and parallel thereto, a vehicle having a frame and a plurality of axles means carrying wheels running on the supporting tracks, a guide wheel frame attached to each of the axle means, two pairs of opposed guide wheels rotatably mounted on vertical axes on each guide wheel frame, each guide wheel having a pneumatic tire thereon, one pair of said guide wheels on each guide wheel frame engaging opposite sides of said guide rail ahead of the axle means and the other pair of guide wheels on each guide wheel frame engaging opposite sides of said guide rail behind the axle means, a safety disc attached to each guide wheel for engaging the flange of the guide rail to resist lateral forces on the vehicle, the diameter of said disc being less than the outside diameter of the tire on the guide wheel when fully inflated, said discs extending under the flange of the guide rail and being normally spaced from the guide rail, the discs being adapted to engage the flange of the guide rail to resist lateral forces on the vehicle, and means independently connecting each axle means directly to the vehicle frame for limited movement relative thereto.

4. A transportation vehicle having a frame and a plurality of supporting axles disposed in housings and carrying wheels adapted to run on a roadway having a flanged guide rail coextensive with the roadway, a guide wheel frame attached to each axle housing, two pairs of opposed guide wheels mounted on vertical axes on the guide wheel frame, each guide wheel having a pneumatic tire thereon, one pair of said guide wheels on each guide wheel frame being disposed to engage opposite sides of the guide rail ahead of the axle and the other pair of guide wheels on each guide wheel frame being disposed to engage opposite sides of the guide rail behind the axle, a safety disc attached to each guide wheel, said discs having a diameter less than the fully inflated diameter of said tires and extending under the flange of the guide rail, the discs being normally spaced from the guide rail and being adapted to engage the flange of the guide rail to resist lateral forces on the vehicle, and means for independently connecting each of the axle housings to the vehicle frame to permit limited movement of the axle housings relative to the frame.

5. In a transportation vehicle having a frame and supporting axles disposed in housings and carrying wheels for running on a roadway having a guide rail coextensive with the roadway, in combination, means for driving the axles, a guide wheel frame attached to each axle housing, four guide wheels rotatably mounted on vertical axes on the guide wheel frame, each guide wheel having a pneumatic tire thereon, two of said guide wheels on each guide wheel frame being disposed to engage opposite sides of the guide rail ahead of the axle and the other two guide wheels on each guide wheel frame being disposed to engage opposite sides of the guide rail behind the axle, longitudinal rod means connected to the axle housing and pivotally connected to the vehicle frame to transmit motor tractive effort and torque reaction to the vehicle frame, and transverse rod means spring connected between the axle housing and the vehicle frame to permit limited lateral movement therebetween.

6. In a transportation vehicle having a frame and supporting axles disposed in housings and carrying wheels for running on a roadway having a flanged guide rail coextensive with the roadway, in combination, means for driving the axles, a guide wheel frame attached to each axle housing, four guide wheels rotatably mounted on vertical axes on the guide wheel frame, each guide wheel having a pneumatic tire thereon, two of said guide wheels on each guide wheel frame being disposed to engage opposite sides of the guide rail ahead of the axle and the other two guide wheels on each guide wheel frame being disposed to engage opposite sides of the guide rail behind the axle, a safety disc attached to each guide wheel for engaging the flange of the guide rail to resist lateral forces on the vehicle, spring means disposed between the vehicle frame and the guide wheel frames for supporting the weight of the vehicle, transverse rod means connected to the axle housings and spring connected to the vehicle frame to permit limited lateral movement of the axles relative to the frame, and longitudinal rod means connected to the axle housings and pivotally connected to the vehicle frame to transmit tractive effort and torque reaction to the vehicle frame.

7. In a transportation vehicle having a frame and supporting axles disposed in housings and carrying wheels for running on a roadway having a flanged guide rail coextensive with the roadway, in combination, means for driving the axles, a guide wheel frame attached to each axle housing, four guide wheels rotatably mounted on vertical axes on each guide wheel frame, each guide wheel having a pneumatic tire thereon, two of said guide wheels on each guide wheel frame being disposed to engage opposite sides of the guide rail ahead of the axle and the other two guide wheels on each guide wheel frame being disposed to engage opposite sides of the guide rail behind the axle, a safety disc attached to each guide wheel for engaging the flange of the guide rail to resist lateral forces on the vehicle, spring means disposed between the vehicle frame and the guide wheel frames for supporting the weight of the vehicle, transverse rod means connected to the axle housings and spring connected to the vehicle frame to permit limited lateral movement of the axles relative to the frame, a swing arm for each axle pivotally attached to the vehicle frame, and longitudinal tie rods connected to the swing arms and to the axle housings to transmit tractive effort and torque reaction to the vehicle frame.

References Cited by the Examiner

UNITED STATES PATENTS

| | | | |
|---|---|---|---|
| 156,922 | 11/1874 | Hale | 104—246 |
| 2,340,869 | 2/1944 | Edahl | 105—190 |
| 2,398,394 | 4/1946 | Piron | 105—197 |
| 2,447,225 | 8/1948 | Bennett | 301—38 |
| 2,510,353 | 6/1950 | Travilla | 105—190 |
| 2,592,700 | 4/1952 | Jackson | 105—190 |
| 2,633,811 | 4/1953 | Poage | 105—197 |
| 2,642,815 | 6/1953 | Baigent | 104—246 |
| 3,084,637 | 4/1963 | Kohout | 104—243 |
| 3,208,798 | 9/1965 | Peters | 301—38 |

ARTHUR L. LA POINT, *Primary Examiner.*

F. W. MONAGHAN, D. F. WORTH,
*Assistant Examiners.*